(12) United States Patent
Serfaty et al.

(10) Patent No.: US 11,954,688 B2
(45) Date of Patent: *Apr. 9, 2024

(54) APPARATUS FOR FRAUD DETECTION RULE OPTIMIZATION

(71) Applicant: Bottomline Technologies Ltd., Or Yehuda (IL)

(72) Inventors: Avital Serfaty, Ramat Hasharon (IL); Shahar Cohen, Qiryat Ono (IL); Yulia Mayer, Fair Lawn, NJ (US); Dalit Amitai, Tennafly, NJ (US)

(73) Assignee: Bottomline Technologies Ltd, Or Yehuda (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,132

(22) Filed: Sep. 8, 2022

(65) Prior Publication Data
US 2023/0004980 A1    Jan. 5, 2023

Related U.S. Application Data

(63) Continuation of application No. 16/985,773, filed on Aug. 5, 2020, now Pat. No. 11,449,870.

(51) Int. Cl.
*G06Q 20/00* (2012.01)
*G06F 16/23* (2019.01)
(Continued)

(52) U.S. Cl.
CPC ..... *G06Q 20/4016* (2013.01); *G06F 16/2365* (2019.01); *G06F 16/2379* (2019.01);
(Continued)

(58) Field of Classification Search
CPC ........ G06Q 20/40; G06Q 30/00; G06Q 40/02; G06Q 20/4016; G06Q 30/0185;
(Continued)

(56) References Cited

U.S. PATENT DOCUMENTS

| 4,575,793 A | 3/1986 | Morel et al. |
| 5,228,122 A | 7/1993 | Cahn et al. |

(Continued)

FOREIGN PATENT DOCUMENTS

| EP | 1211865 A2 | 6/2002 |
| EP | 1706960 A1 | 10/2006 |

(Continued)

OTHER PUBLICATIONS

Wikil Kwak, Yong Shi, John J. Cheh, and Heeseok Lee, "Multiple Criteria Linear Programming Data Mining Approach: An Application for Bankruptcy Prediction", : Data Mining and Knowledge Management, Chinese Academy of Sciences Symposium, 2004, LNAI 3327, pp. 164-173, 2004.

(Continued)

*Primary Examiner* — Scott S Trotter
(74) *Attorney, Agent, or Firm* — Downs Rachlin Martin PLLC

(57) ABSTRACT

An improved method and apparatus for determining if a financial transaction is fraudulent is described. The apparatus in one embodiment collects transactions off of a rail using promiscuous listening techniques. The method uses linear programming algorithms to tune the rules used for making the determination. The tuning first simulates using historical data and then creates a matrix of the rules that are processed through the linear programming algorithm to solve for the variables in the rules. With the updated rules, a second simulation is performed to view the improvement in the performance. The updated rules are then used to evaluate the transactions for fraud.

20 Claims, 5 Drawing Sheets

(51) Int. Cl.
  *G06N 5/04* (2023.01)
  *G06N 20/00* (2019.01)
  *G06Q 20/40* (2012.01)
  *G06Q 30/018* (2023.01)
  *G06Q 40/02* (2023.01)

(52) U.S. Cl.
  CPC .............. *G06N 5/04* (2013.01); *G06N 20/00* (2019.01); *G06Q 30/0185* (2013.01); *G06Q 40/02* (2013.01); *G06Q 2220/00* (2013.01)

(58) Field of Classification Search
  CPC . G06Q 2220/00; G06F 16/23; G06F 16/2379; G06N 20/00; G06N 5/04
  See application file for complete search history.

(56) References Cited

U.S. PATENT DOCUMENTS

| | | |
|---|---|---|
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |
| 5,644,717 A | 7/1997 | Clark |
| 5,790,798 A | 8/1998 | Beckett et al. |
| 5,845,369 A | 12/1998 | Dunchock |
| 5,912,669 A | 6/1999 | Hsia |
| 5,961,592 A | 10/1999 | Hsia |
| 5,970,482 A | 10/1999 | Pham et al. |
| 6,044,401 A | 3/2000 | Harvey |
| 6,192,411 B1 | 2/2001 | Chan et al. |
| 6,205,416 B1 | 3/2001 | Butts et al. |
| 6,256,737 B1 | 7/2001 | Bianco et al. |
| 6,523,016 B1 | 2/2003 | Michalski |
| 6,651,099 B1 | 11/2003 | Dietz et al. |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,801,190 B1 | 10/2004 | Robinson et al. |
| 6,845,369 B1 | 1/2005 | Rodenburg |
| 7,092,941 B1 | 8/2006 | Campos |
| 7,174,462 B2 | 2/2007 | Pering et al. |
| 7,308,436 B2 | 12/2007 | Bala et al. |
| 7,415,509 B1 | 8/2008 | Kaltenmark et al. |
| 7,730,521 B1 | 6/2010 | Thesayi et al. |
| 7,822,598 B2 | 10/2010 | Carus et al. |
| 7,831,703 B2 | 11/2010 | Krelbaum et al. |
| 7,860,783 B2 | 12/2010 | Yang et al. |
| 7,992,202 B2 | 8/2011 | Won et al. |
| 8,229,875 B2 | 7/2012 | Roychowdhury |
| 8,229,876 B2 | 7/2012 | Roychowdhury |
| 8,392,975 B1 | 3/2013 | Raghunath |
| 8,429,745 B1 | 4/2013 | Casaburi et al. |
| 8,433,791 B2 | 4/2013 | Krelbaum et al. |
| 8,515,862 B2 | 8/2013 | Zhang et al. |
| 8,638,939 B1 | 1/2014 | Casey et al. |
| 8,650,624 B2 | 2/2014 | Griffin et al. |
| 8,776,213 B2 | 7/2014 | McLaughlin et al. |
| 8,844,059 B1 | 9/2014 | Manmohan |
| 8,881,005 B2 | 11/2014 | Al et al. |
| 9,015,036 B2 | 4/2015 | Karov et al. |
| 9,489,627 B2 | 11/2016 | Bala |
| 9,529,678 B2 | 12/2016 | Krelbaum et al. |
| 9,537,848 B2 | 1/2017 | McLaughlin et al. |
| 9,607,103 B2 | 3/2017 | Anderson |
| 9,667,609 B2 | 5/2017 | McLaughlin et al. |
| 9,691,085 B2 | 6/2017 | Scheidelman |
| 10,037,533 B2 | 7/2018 | Caldera |
| 10,152,680 B1 | 12/2018 | Myrick et al. |
| 10,235,356 B2 | 3/2019 | Amend et al. |
| 10,242,258 B2 | 3/2019 | Guo et al. |
| 10,320,800 B2 | 6/2019 | Guo et al. |
| 10,402,817 B1 | 9/2019 | Benkreira et al. |
| 10,414,197 B2 | 9/2019 | Jesurum |
| 10,440,015 B1 | 10/2019 | Pham et al. |
| 10,467,631 B2 | 11/2019 | Dhurandhar et al. |
| 10,510,083 B1 | 12/2019 | Vukich et al. |
| 10,511,605 B2 | 12/2019 | Ramberg et al. |
| 10,523,681 B1 | 12/2019 | Bulgakov et al. |
| 10,552,837 B2 | 2/2020 | Jia et al. |
| 10,552,841 B1 | 2/2020 | Dixit |
| 10,607,008 B2 | 3/2020 | Byrne et al. |
| 10,607,228 B1 | 3/2020 | Gai et al. |
| 10,621,587 B2 | 4/2020 | Binns et al. |
| 10,699,075 B2 | 6/2020 | Amend et al. |
| 10,824,809 B2 | 11/2020 | Kutsch et al. |
| 11,042,555 B1 | 6/2021 | Kane et al. |
| 2002/0019945 A1 | 2/2002 | Houston et al. |
| 2002/0056043 A1 | 5/2002 | Glass |
| 2002/0065938 A1 | 5/2002 | Jungck et al. |
| 2002/0080123 A1 | 6/2002 | Kennedy et al. |
| 2002/0099649 A1 | 7/2002 | Lee et al. |
| 2002/0163934 A1 | 11/2002 | Moore et al. |
| 2003/0041042 A1 | 2/2003 | Cohen et al. |
| 2003/0083764 A1 | 5/2003 | Hong |
| 2003/0110394 A1 | 6/2003 | Sharp et al. |
| 2003/0135612 A1 | 7/2003 | Huntington et al. |
| 2003/0233305 A1 | 12/2003 | Solomon |
| 2004/0034666 A1 | 2/2004 | Chen |
| 2004/0186882 A1 | 9/2004 | Ting |
| 2004/0193512 A1 | 9/2004 | Gobin et al. |
| 2005/0021650 A1 | 1/2005 | Gusler et al. |
| 2005/0081158 A1 | 4/2005 | Hwang |
| 2005/0154692 A1 | 7/2005 | Jacobsen et al. |
| 2005/0177483 A1 | 8/2005 | Napier et al. |
| 2006/0101048 A1 | 5/2006 | Mazzagatti et al. |
| 2006/0155751 A1 | 7/2006 | Geshwind et al. |
| 2006/0190310 A1 | 8/2006 | Gudla et al. |
| 2006/0212270 A1 | 9/2006 | Shiu et al. |
| 2007/0277224 A1 | 11/2007 | Osborn et al. |
| 2008/0104007 A1 | 5/2008 | Bala |
| 2009/0059793 A1 | 3/2009 | Greenberg |
| 2009/0094677 A1 | 4/2009 | Pietraszek et al. |
| 2009/0140838 A1 | 6/2009 | Newman et al. |
| 2009/0174667 A1 | 7/2009 | Kocienda et al. |
| 2009/0201257 A1 | 8/2009 | Saitoh et al. |
| 2009/0202153 A1 | 8/2009 | Cortopassi et al. |
| 2009/0307176 A1 | 12/2009 | Jeong et al. |
| 2009/0313693 A1 | 12/2009 | Rogers |
| 2010/0066540 A1 | 3/2010 | Theobald et al. |
| 2010/0130181 A1 | 5/2010 | Won |
| 2010/0169958 A1 | 7/2010 | Werner et al. |
| 2010/0225443 A1 | 9/2010 | Bayram et al. |
| 2011/0055907 A1 | 3/2011 | Narasimhan et al. |
| 2011/0070864 A1 | 3/2011 | Karam et al. |
| 2011/0082911 A1 | 4/2011 | Agnoni et al. |
| 2011/0145587 A1 | 6/2011 | Park |
| 2011/0251951 A1 | 10/2011 | Kolkowitz et al. |
| 2011/0298753 A1 | 12/2011 | Chuang et al. |
| 2012/0041683 A1 | 2/2012 | Vaske et al. |
| 2012/0124662 A1 | 5/2012 | Baca et al. |
| 2012/0127102 A1 | 5/2012 | Jenohara et al. |
| 2012/0151553 A1 | 6/2012 | Burgess et al. |
| 2013/0071816 A1 | 3/2013 | Singh et al. |
| 2013/0117246 A1 | 5/2013 | Cabaniols et al. |
| 2013/0231974 A1 | 9/2013 | Harris et al. |
| 2013/0339141 A1 | 12/2013 | Stibel et al. |
| 2014/0006347 A1 | 1/2014 | Qureshi et al. |
| 2014/0067656 A1 | 3/2014 | Cohen et al. |
| 2014/0149128 A1 | 5/2014 | Getchius |
| 2014/0149130 A1 | 5/2014 | Getchius |
| 2014/0366159 A1 | 12/2014 | Cohen |
| 2015/0039473 A1 | 2/2015 | Hu et al. |
| 2015/0220509 A1 | 8/2015 | Karov Zangvil et al. |
| 2015/0264573 A1 | 9/2015 | Giordano et al. |
| 2015/0348041 A1 | 12/2015 | Campbell et al. |
| 2016/0041984 A1 | 2/2016 | Kaneda et al. |
| 2016/0352759 A1 | 12/2016 | Zhai |
| 2017/0039219 A1 | 2/2017 | Acharya et al. |
| 2017/0154382 A1 | 6/2017 | McLaughlin et al. |
| 2017/0163664 A1 | 6/2017 | Nagalla et al. |
| 2017/0177743 A1 | 6/2017 | Bhattacharjee et al. |
| 2017/0300911 A1 | 10/2017 | Alnajem |
| 2018/0107944 A1 | 4/2018 | Lin et al. |
| 2018/0349924 A1 | 12/2018 | Shah et al. |

(56) References Cited

U.S. PATENT DOCUMENTS

| | | |
|---|---|---|
| 2019/0197189 A1 | 6/2019 | Studnicka |
| 2019/0228411 A1 | 7/2019 | Hernandez-Ellsworth et al. |
| 2019/0347281 A1 | 11/2019 | Natterer |
| 2019/0349371 A1 | 11/2019 | Smith et al. |
| 2019/0373001 A1 | 12/2019 | Deeb et al. |
| 2020/0019964 A1 | 1/2020 | Miller et al. |
| 2020/0117800 A1 | 4/2020 | Ramberg et al. |
| 2021/0049326 A1 | 2/2021 | Amend et al. |

FOREIGN PATENT DOCUMENTS

| | | | |
|---|---|---|---|
| EP | 2653982 | A1 | 10/2013 |
| EP | 2636149 | A4 | 10/2016 |
| IL | 176551 | A | 9/2012 |
| IN | 219405 | | 3/2007 |
| KR | 10-0723738 | B1 | 5/2007 |
| TW | 201723907 | A | 7/2017 |
| WO | 01/25914 | A2 | 4/2001 |
| WO | 02/87124 | A1 | 10/2002 |
| WO | 2002/100039 | A2 | 12/2002 |
| WO | 03/73724 | A2 | 9/2003 |
| WO | 2005/067209 | A1 | 7/2005 |
| WO | 2012/061701 | A1 | 5/2012 |
| WO | 2014/145395 | A2 | 9/2014 |
| WO | 2017/096206 | A1 | 6/2017 |
| WO | 2017/209799 | A1 | 12/2017 |

OTHER PUBLICATIONS

Samaneh Sorournejad, Zahra Zojaji, Reza Ebrahimi Atani, Amir Hassan Monadjemi, "A Survey of Credit Card Fraud Detection Techniques: Data and Technique Oriented Perspective", 2016.

G. Kou, Y. Peng, Y. Shi, M. Wise, W. Xu, Discovering credit cardholders behavior by multiple criteria linear programming, Annals of Operations Research 135, (2005) 261-274.

"Guide to Combating Corruption & Fraud in Development Projects", "Potential Scheme: False, Inflated and Duplicate Invoices", 2020, web page downloaded from https://guide.iacrc.org/potential-scheme-false-inflated-and-duplicate-invoices/ on Jun. 9, 2020.

Mitchell, Stuart, et al, "pulp Documentation", Release 1.4.6, Jan. 27, 2010.

Appaloosa Store, "Siring Similarity Algorithms Compared", Apr. 5, 2018, webpage downloaded on Oct. 20, 2020 rom https://medium.com/@appaloosastore/string-similarity-algorithms-compared-3f7b4d12f0ff.

Banon, Shay, "Geo Location and Search", elastic blog post, Aug. 16, 2010, webpage found at https://www.elastic.co/blog/geo-location-and-search on Oct. 15, 2019.

Bansal, Nikhil, Avrim Blum, and Shuchi Chawla. "Correlation clustering." Machine Learning 56.1-3 (2004): 89-113.

Bottomline Technologies, Bottomline Cyber Fraud & Risk Management:Secure Payments, marketing brochure.

Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.

Co-pending U.S. Appl. No. 13/135,507, filed Jul. 7, 2011.

Dalit Amitai, Shahar Cohen, Yulia Mayer, and Avital Seraty, "Fraud Detection Rule Optimization", U.S. Appl. No. 16/985,773, filed Aug. 5, 2020.

Experian, "Fuzzy address searching", webpage downloaded from https://www.edq.com/glossary/fuzzy-address-searching/ on Oct. 8, 2019.

Fenz, Dustin, et al, "Efficient Similarity Search in Very Large String Sets", conference paper, Jun. 2012.

Finley, Thomas, and Thorsten Joachims. "Supervised clustering with support vector machines." Proceedings of the 22nd international conference on Machine learning, ACM, 2005.

Haydn Shaughnessy, Solving the $190 billion Annual Fraud Problem: More on Jumio, Forbes, Mar. 24, 2011.

IdentityMing, Accelerated Fintech Compliance and Powerful Online Fraud Prevention Tools, website found at https://identitymindglobal.com/momentum/ on Dec. 12, 2018.

International Search Report and Written Opinion received for PCT Patent Application No. PCT/IL05/000027, dated Jun. 2, 2005, 8 pages.

International Search Report and Written Opinion received for PCT Patent Application No. PCT/US17/13148, dated May 19, 2017, 11 pages.

International Search Report for corresponding International Application No. PCT/US2016/064689 dated Feb. 22, 2017.

Jeremy Olshan, How my bank tracked me to catch a thief, MarketWatch, Apr. 18, 2015.

Meia et al., Comparing clusterings—an information based distance, Journal of Multivariate Analysis 98 (2007) 873-895.

Postel et al.; "Telnet Protocol Specification" RFC 854; entered into the case on Apr. 18, 2013.

RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.

Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.

Schulz, Klaus and Stoyan Mihov, "Fast String Correction with Levenshtein-Automata", IJDAR (2002) 5: 67. https://doi.org/10.1007/s10032-002-0082-8.

The Telnet Protocol Microsoft Knowledgebase; entered into the case on Apr. 18, 2013.

Vogler, Raffael, "Comparison of Siring Distance Algorithms", Aug. 21, 2013, webpage downloaded on Oct. 20, 2020 from https://www.joyofdala.de/blog/comparison-of-string-distance-algorithms.

Wikipedia, "Autoencoder", web page downloaded from http://en.wikipedia.org/wiki/Autoencoder on Dec. 18, 2020.

Wikipedia, "Damerau-Levenshtein distance", webpage downloaded on Oct. 20, 2020 from https://en.wikipedia.org/wiki/Damerau-Levenshtein_distance.

Written Opinion of the International Searching authority for corresponding International Application No. PCT/US2016/064689 dated Feb. 22, 2017.

Where T = Σ X$_i$  Each X$_i$ returns a score that is summed and compared to T

APPARATUS FOR FRAUD DETECTION RULE OPTIMIZATION

PRIOR APPLICATION

This application is a continuation of U.S. Pat. No. 11,449,870, "Fraud Detection Rule Optimization", issued to the inventors on Sep. 20, 2022, filed on Aug. 5, 2020, as U.S. patent application Ser. No. 16/985,773, said patent incorporated herein by reference in its entirety.

BACKGROUND

Technical Field

The apparatuses and methods described herein generally relate to fraud detection, in particular to the use of linear and non-linear programming techniques to detect financial fraud.

Description of the Related Art

The earliest history of fraud is found in Greek literature, and history includes numerous schemes and tactics for taking money from others using deceptive means. One article in Forbes Magazine set the amount of money lost to fraud at $190 billion per year in 2009, with banks absorbing $11 Billion, consumers taking a $4.8 Billion hit, and merchants absorbing the rest. The sheer magnitude of the money lost to fraud has forced banks to place an increasing emphasis on fraud detection.

Today, banking fraud is a sophisticated global business. Cybercriminals are organized, coordinated, and highly specialized, thus creating a powerful network that is, in many ways, a significantly more efficient ecosystem than the banking industry. They continually reinvest their financial gains to advance technology and methods used to defeat the layers of security financial institutions put in place.

The pace of fraud innovation by fraudsters and their ability to invest in attacking banks and credit unions far outweigh these institutions' abilities to invest in protecting themselves against rapidly evolving threats. Whether it's phishing scams, mobile malware, banking Trojans, Man-In-the-Browser schemes, or the many techniques for bypassing multi-factor authentication, threats span online banking, mobile banking, as well as the ACH and wire payments channels. The range and sophistication of the threats against which financial institutions must defend themselves continue to grow.

The traditional approach to fraudulent activities is to manually analyze historical transactions looking for patterns or for transactions that are out of line with the norm. But these methods fail to prevent fraudulent activities, instead, they only serve to disclose what happened in the past. And the sheer volume of transactions prevents the review of more than a small sampling of the overall transaction set.

There is a long-felt need to efficiently and automatically review and identify potentially fraudulent transactions in real-time as the transactions cross the payment rail. Recent software solutions analyze payments or financial transfers against a set of rules to determine a risk score. The risk score is compared to a threshold that determines whether the transaction is fraudulent. But these rules are simple and not verifiable against the reality of the actual transactions. Many of the thresholds are set based on rules of thumb rather than based on data. A method is needed to improve the rules set, to tune, and verify the set of rules to minimize false positives and false negatives.

The present inventions overcome this shortcoming of the existing art.

BRIEF SUMMARY OF THE INVENTIONS

An improved apparatus for detecting fraud is disclosed herein. The apparatus is made up of a p-monitor, a rail, the p-monitor connected to the rail, and a data store connected to the p-monitor, the data store containing historical data, and a draft rule set. The p-monitor creates a matrix of each rule in the draft rule set for each historical transaction in the historical data and solves the matrix for each rule score using linear programming, said rule scores copied into a model rule set. The p-monitor also monitors the rail for a new transaction, applying data from the new transaction to the model rule set to produce a new transaction score, and if the new transaction score exceeds a threshold, the p-monitor indicates that the new transaction is fraudulent.

In some embodiments, the matrix is solved for a constant in one of the rules. If the p-monitor determines that the new transaction is fraudulent, the p-monitor could notify a fraud monitor that the new transaction is fraudulent, and/or the p-monitor could notify a bank that the new transaction is fraudulent. The p-monitor could request that the bank block the new transaction.

In some embodiments, the p-monitor loops through each transaction in the historical data, calculating a transaction score for each historical transaction that is a sum of the rule scores for that historical transaction and comparing that score with the threshold to make a fraud determination, said fraud determination compared with an actual determination associated with the historical transaction to create a transaction accuracy score, the transaction accuracy score summed to determine a model rule set quality metric. The model rule set quality metric could be compared to an expected quality metric, and only copy the rule scores if the model rule set quality metric exceeds the expected quality metric.

The p-monitor could be connected to the rail through banking software, the banking software calling the p-monitor, and passing the new transaction to the p-monitor. Or the p-monitor could receive the new transaction in a message directed, on the rail, specifically to the p-monitor for processing. In still another embodiment, the p-monitor monitors the rail for the new transaction intended for another network device.

A method of detecting a fraudulent transaction on a rail is also described. The method is made up of the steps of (1) creating a matrix of each rule in a draft rule set for each historical transaction in historical data stored in a data store; (2) solving the matrix for each rule score using linear programming; (3) copying said rule scores into a model rule set; (4) monitoring the rail for a new transaction; (5) applying data from the new transaction to the model rule set; (6) producing a new transaction score from the data and the model rule set; and (7) indicating that the new transaction is fraudulent if the new transaction score exceeds a threshold.

In some embodiments, the matrix is solved for a constant in one of the rules. The method could also include the step of (8) notifying a fraud monitor that the new transaction is fraudulent. In some embodiments the step of (9) notifying a bank that the new transaction is fraudulent and maybe the step of (10) requesting that the bank block the new transaction.

The method could also include the steps of (2a) looping through each transaction in the historical data; (2b) calculating a transaction score for each historical transaction that is a sum of the rule scores for that historical transaction; (2c) comparing the sum of rule scores with the threshold to make a fraud determination, said fraud determination compared with an actual determination associated with the historical transaction to create a transaction accuracy score; and (2d) summing said transaction accuracy score to determine a model rule set quality metric. Optionally the method could also include the modification of step (3) with (3a) comparing the model rule set quality metric to an expected quality metric, and only loading the rule scores if the model rule set quality metric exceeds the expected quality metric.

Step (4) could be modified as follows (4a) the monitoring of the rail is indirect through banking software. Or step (4) could be modified with (4b) the monitoring of the rail for the new transaction receives transactions intended for another network device.

DETAILED DESCRIPTION

Figure 1:
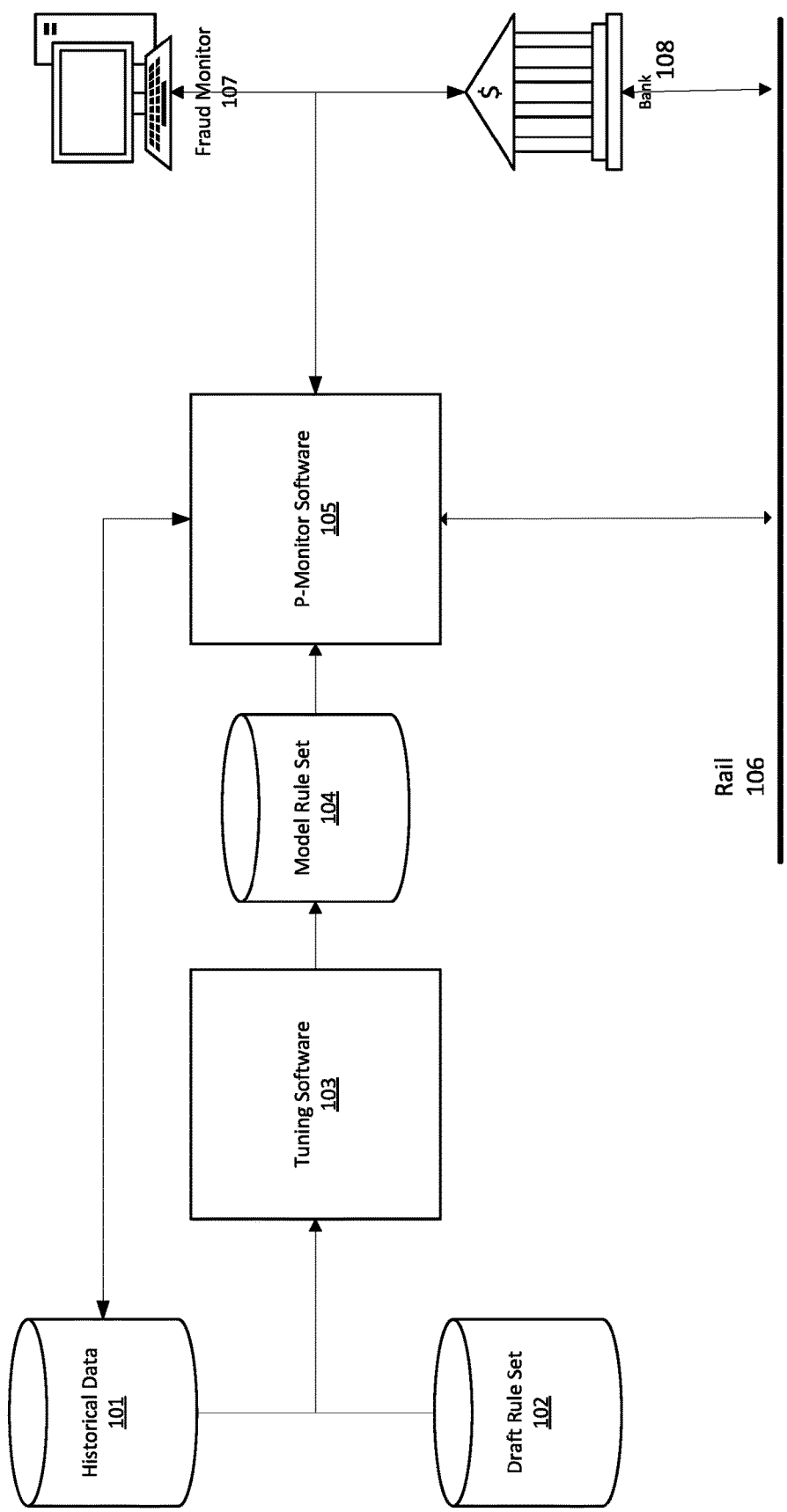
FIG. 1 is a block diagram of the components of the present system.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present inventions propose an improved solution to the monitoring of banking and financial transactions for fraudulent activities. These techniques could also be used for financial account openings, analysis of payments and invoices, in the monitoring of pharmaceutical prescriptions for illegal distributions of controlled substances, in government monitoring of various activities, such as import and exports for tariff evasions or tax avoidance, for example, or for other uses. In each case, these techniques solve the problems of improving and tuning rule sets used in the monitoring of activities.

Looking at FIG. 1, a system diagram is presented showing the fraud monitoring environment. A database holding the historical data 101 contains all of the transaction records for a period of time. This timeframe could be anywhere from hours to decades of data, depending on the velocity of the transactions, but typically is a unit of months, perhaps 6 or 12 months of data. In some embodiments, each transaction seen on the rail 106 is added to the historical data 101, either through another process in the system or through the p-monitor software 105. In some embodiments, the historical data 101 is further edited to add information or to remove outliers. Such added information may include actual fraud determinations by a fraud investigation team. For instance, if a transaction is flagged by the p-monitor software 105 as fraudulent, it is sent to the fraud monitor 107 for analysis by the fraud investigation team. This team investigates the fraud and makes the ultimate decision on whether this is a false positive or a true positive. This information may be then added to the transaction record in the historical data 101. Similarly, if a transaction is not identified as fraud by the p-monitor software 105, but the fraud is discovered later, by a customer or another financial institution perhaps, then the fraud investigation team may update the transaction record in the historical data 101 to reflect the false negative. These false positive and false negative records are particularly relevant to the tuning of the model rule set 104 in the next round of tuning.

The objective of the process is to optimize the assignments of scores to the different incidents that the rule's engine creates. The rule sets 102, 104 have multiple templates, where the templates might have parameters and thresholds. Different thresholds may create different incidents. Each incident has a configured score. If the sum of scores due to the created incidents accedes a pre-defined threshold, a fraud alert is created.

In some embodiments, the historical data 101 is analyzed to produce statistics on the data. For instance, a count of the number of transactions, the sum of the amounts of the transactions, the number of transactions sent to blacklist destinations, etc. for a particular sending customer may be calculated and maintained as new transactions are added.

A draft rule set 102 is also stored in a database. The draft rule set 102 is a set of rules that may indicate fraudulent behavior when applied to a transaction. The draft rule set 102 could originate with the supplier of the tuning software 103 and p-monitor software 105, and may be refined by the financial institution operating the software. If the software has been installed for a period of time, the draft rule set 102 may be the result of one or more tuning iterations in the past that have refined the original rule set.

In the present embodiment, each incident (i) generates a score $X_i$. The scores for each incident for a given transaction are summed ($\Sigma_{i=0}{}^n X_i$), where n is the number of potential incidents, which might be produced by the rule set 102, 104, and if the sum is greater than a threshold (T), the then transaction is deemed fraudulent.

The rule set may be in the form of a human-readable description of the rules, a set of mathematical formulas, or may be in the form of a matrix of parameters for the rule set. In one example of a rule, the rule may read "WPF0201 Customer carries out a payment transaction to an account in a blacklist: If the customer's blacklist transaction count>0 and the transaction amount is >0, then score the transaction as 1000". In this example, natural language processing is used to translate the formula into computer-usable formats. In a second example of a rule, the rule could be written "WPF0201: score=if (customer.BlackListCount>0) and (TransactionAmount>0) then 1000 else 0". In still a third embodiment, the following matrix could be used:

TABLE 1

Matrix Rule Set

| Rule | Transaction Amount | Transaction Count | Rejected Transaction Count | New Payees | Blacklist Count | Score |
|---|---|---|---|---|---|---|
| WPF0201 | >0 | | | | >0 | 1000 |
| WPF0208A | >50,000 and ≤80,000 | | | | | 50 |
| WPF0208B | >80,000 | | | | | 80 |

The tuning software 103 transforms the draft rule set 102 into the model rule set 104 by using the historical data 101 to tune the parameters and score for each rule in the ruleset. This transformation is performed using linear programming in the present embodiment. In other embodiments, non-linear programming is used, if there is a need for non-linear (curves, exponential, logarithmic, quadratic, etc) rules.

The object of the tuning is to optimize the score value for each incident and to optimize the parameters such that the rules generate the smallest overall score for a non-fraudulent transaction without allowing a false-negative result. At the same time, the tuning is minimizing false-positive results.

Essentially, this solves for each $X_i$ across a large number of transactions in the historical data 101. Let $X_i$ be the score that should be assigned to incident i (i=1, ..., n), let $C_{ji}$ be the Boolean indicator for the occurrence of incident i in transaction j, and let T be a threshold score (so that according to the rule's engine, if the sum of scores by the incidents exceeds T, the transaction is a fraud). For instance, for this example rule, if the transaction is going to a blacklisted country, then the value of the incident $X_i$ is added to the sum. If it is not going to a blacklisted country, then 0 is added to the sum.

$$\min\left\{\sum_{i=1}^{n} X_i\right\}$$

Such that $\sum_{i=1}^{n} C_{ji} \cdot X_i \geq T$ for all transactions j $X_i \geq 0$ for all i The tuning software 103 is described in more detail in the discussion of FIG. 2 below. The tuning software 103 outputs a model rule set 104 that is tuned with the historical data 101.

The model rule set 104 is a set of rules that may indicate fraudulent behavior when applied to a transaction. The model rule set 104 will use similar formats to the draft rule set 102, in most embodiments. In some other embodiments, the model rule set 104 will be in a machine-readable format, perhaps the matrix format in Table 1 or machine code that is readily executable by a central processing unit 404 in the p-monitor 406. The model rule set 104 is used by the p-monitor software 105 to analyze each transaction seen on the rail 106.

The p-monitor software 105, in some embodiments, listens to the transactions on the rail 106 in promiscuous listener mode, retrieving all transactions that cross the rail 106. When a transaction is seen, it is stored in the historical data 101 and the transaction is compared to the model rule set 104 to determine if the transaction is fraudulent. The details of the p-monitor software 105 are found below in conjunction with the discussion of FIG. 3. In another embodiment, a bank, a financial institution, or another software package could collect the transactions and send them to the p-monitor software 105. For instance, a bank 108 may run banking software that processes each transaction that the bank 108 receives on the rail 106. The banking software may send each transaction to the p-monitor software before processing the transaction to see if the transaction is fraudulent.

The rail 106 is a payment or banking rail used to connect banks, financial institutions, or their customers. It is a high-security network that uses encryption and limits access either physically or virtually (VPN). The physical implementation of the rail 106 could be the internet, a local area network, a wireless network, a combination of the above, or any other networking technology.

If the p-monitor software 105 determines that a transaction is fraudulent, then the p-monitor software, in some embodiments, notifies the bank 108 (or financial institution or the customer) to hold the transaction. A notification is also sent to the fraud monitor 107 for investigation by the fraud investigation team. The fraud investigation team then will review the transaction and the historical data to decide on whether to cancel the transaction. The fraud investigation team will also mark the transaction as actual fraud, false-positive, or justified. A justified determination is when the transaction appears fraudulent and is not fraudulent, but the fraud investigation team wants to review this type of transaction. When tuning in the future, the justified transactions are considered fraudulent.

The fraud monitor 107 could be a personal computer, laptop, smartphone, tablet, smartwatch, or similar device connected directly or indirectly through a network to the p-monitor 406. The fraud monitor 107 has the interface between the p-monitor software and the fraud investigation team.

Figure 2:
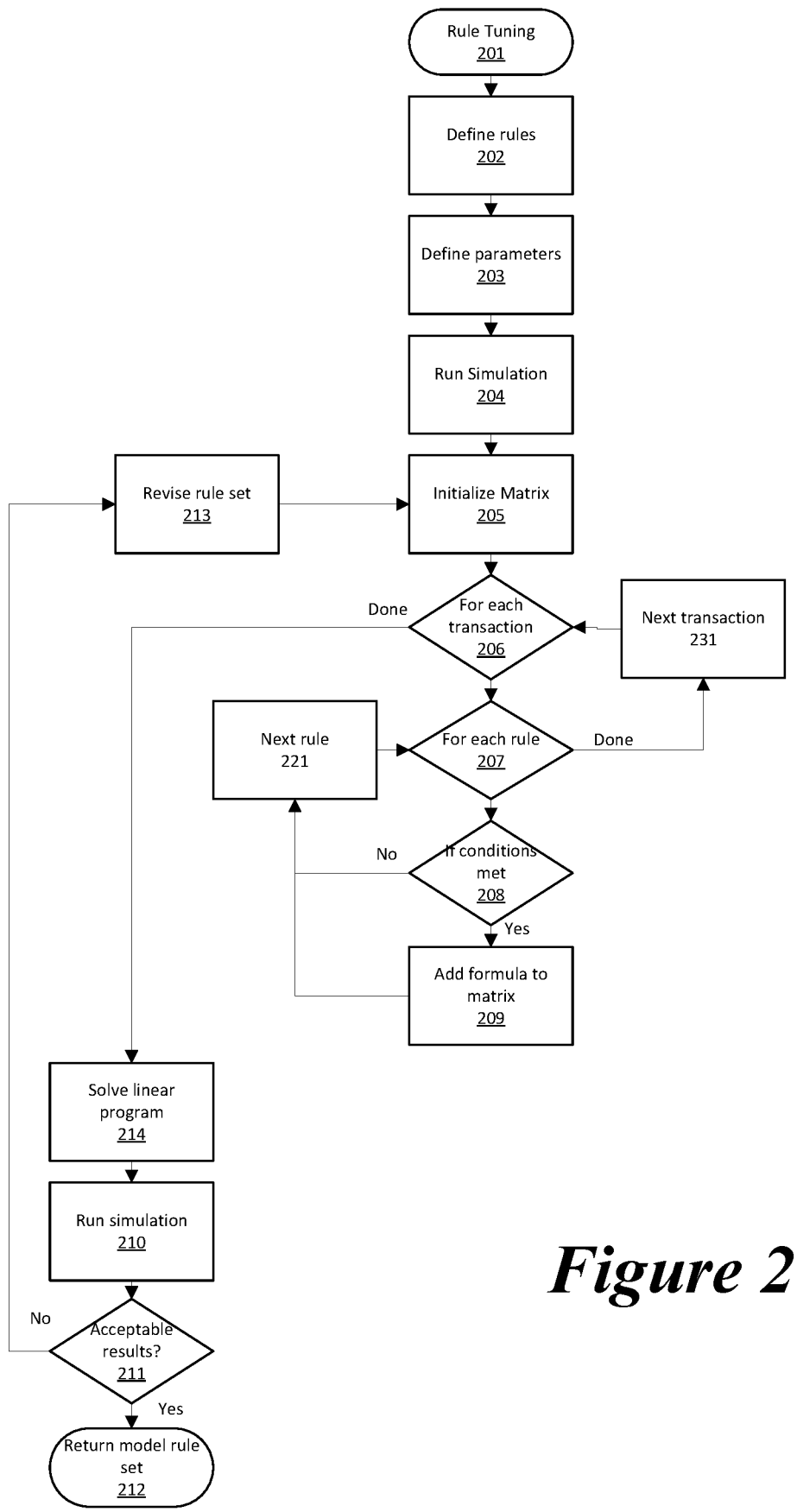
FIG. 2 is a flow chart of the rules optimization process.

FIG. 2 shows the details of the tuning software 103. The start of the rule tuning 201 process begins with defining rules 202 and defining parameters 203. The initial rule set could come from the software vendor and then be modified by the customer. In other instances of the rule tuning process, the rules and parameters are defined by a previous iteration through this software. Each rule may create one or more incidents and might have several parameters that affect its operation. Each incident has a score value. For example, rule WPF0208 covers incidents that are generated when a customer carries out excessive payment transactions to a country where he has never made any transactions to that country before. The relevant parameters might be the lookback period (how far back do we check to see if a transaction has ever been sent to that country), the vesting period, the minimum learning period, the minimum number of transactions, the minimal total amount, the countries active list, and the set of scores. Different incidents might be created by the rule, depending for example on the payment amount.

Transactions of large amounts might generate one incident, while transactions with a lower amount might generate another incident.

Each parameter might have static values (for example, the lookback period may always be 180 days, and not tunable), which means that it does not participate in the optimization, or it can receive a set of values. Each such unique value is responsible for a single incident. The set of values might come from a per-customer calculation. For example, the minimum total amount might receive [V1, V2, V3] where V1 is the 50 percentile of the transaction amount of customer accounts' transactions, V2 is the 75 percentile, and V3 is the 90 percentile. The number of unique values shouldn't be too large, and it is recommended to span a range of values only to the numeric parameters (e.g., transaction amount). Each unique combination of values to the different parameters define a different incident for the rule. For example, WPF0208_V1 might be defined as the incident that is generated by rule WPF0208 when the transaction amount parameter receives V1 (assuming that all the other parameters in this rule are static).

Once the rules, parameters, and scores are set, a simulation 204 is run on the draft rule set 102 using the historical data 101, creating a table with all of the rules and transactions. The resulting table may look similar to Table 2.

TABLE 2

Simulation result matrix

| Transaction ID | WPF0201 Incident | WPF0208A Incident | WPF0208B Incident | WPF0209 Incident | WPF0211 Incident | Score | Calculated Fraud | Actual Fraud |
|---|---|---|---|---|---|---|---|---|
| 10201 | 0 | 50 | 0 | 0 | 1000 | 1050 | YES | NO |
| 10202 | 1000 | 0 | 80 | 0 | 0 | 1080 | YES | YES |
| 10215 | 0 | 0 | 0 | 0 | 0 | 0 | NO | NO |

In Table 2, a subset of the transactions rules and incidents are listed, as the number of transactions could be in the millions and the number of incidents could number up to several hundred. The transaction ID comes from either the actual transaction number or from a unique identifier in the historical data 101. The value for each cell is the score that is associated with the incident. For example, in transaction 10202, the customer is trying to send $85,000 and has sent money to a blacklist destination within the past 180 days. The result for rule WPF0201: score=if (customer.BlackListCount>0) and (TransactionAmount>0) then 1000 else 0 will be 1000, because of the blacklist history and the transaction amount is greater than 0. WPF0208A is 0 because the transaction amount is not between $50,000 and $80,000, and WPF0208B is 80 because the transaction is greater than $80,000 (rule WPF0208 produces an incident with a score of 50 if the transaction amount is over $50,000 and an incident with a score of 80 if over $80,000). The sum of 1000, 0, and 80 is 1080, the score for this transaction. Since the score is greater than T, the fraud threshold of 1000, we calculate that the transaction is a fraud. This matches the actual fraud for this transaction, so the model produces a true fraud. Transaction 10201 calculates 1050, over the fraud threshold T, so we calculate that it is fraudulent, but the actual determination is that the transaction is not fraudulent, so we have a False Positive. Once the simulation is complete, an accuracy metric is calculated by calculating the percentage of False Positives and False Negatives. These numbers represent the quality of the ruleset.

Next, a linear programming matrix is initialized 205 to zero, and then the linear programming matrix is filled and solved for the minimum rule score values and the minimum constants required, using the PuLP linear programming package in one embodiment. Other embodiments might be using different software for solving the linear program. For each transaction 206 in the historical data 101, loop through analyzing each rule. For each rule 207 in the draft rule set 102, loop through the incidents, testing the conditions 208 to see if the conditions are met and if so, the incident is added to the matrix 209 and the next rule is retrieved 221. In the PuLP embodiment, the entire row of the matrix is a string containing the formula to solve, so the addition of the rule is a concatenation of the string containing that rule. The values are not plugged in, the rule is simple: WPF0201: score=if (customer.BlackListCount>0) and (TransactionAmount>0) then 1000 else 0 will be 1000. Other formats could be used without detracting from the inventions. When all rules are processed, the next transaction 231 is retrieved.

Once all of the rules are entered for all transactions, the linear program (as stored in the matrix) is solved 214 by using the PuLP solve( ) function. Other linear programming packages could also be used without detracting from these inventions.

The PuLP package uses algorithms such as the Revised Simplex Method or Interior Point Methods for simple and well-understood matrices. More complicated problems use heuristic methods that do not guarantee optimality. Other algorithms for solving linear programming problems include George Dantzig's simplex algorithm or a criss-cross algorithm.

Once the linear program is solved 214, each calculated parameter and the calculated score for each rule are copied back into the draft rule set 102 creating the model rule set 104.

The model rule set 104 is then run through the simulation 210, using the historical data 101, in the same way, the simulation was performed in 204. Once the simulation is complete, an accuracy metric is calculated by calculating the percentage of False Positives and False Negatives. These numbers represent the quality of the model rule set 104. If the quality numbers did not improve, if the linear program could not be solved, or if the quality numbers are still not at an acceptable level 211, reinitialize the matrix 205 with a new rules set 213 (changing various $C_{ij}$ constraints or eliminating one or more rules) and rerun the linear programming using the model rule set 104.

If the results are acceptable 211, return 212 the model rule set 104 to the calling routine where it is saved.

Figure 3:
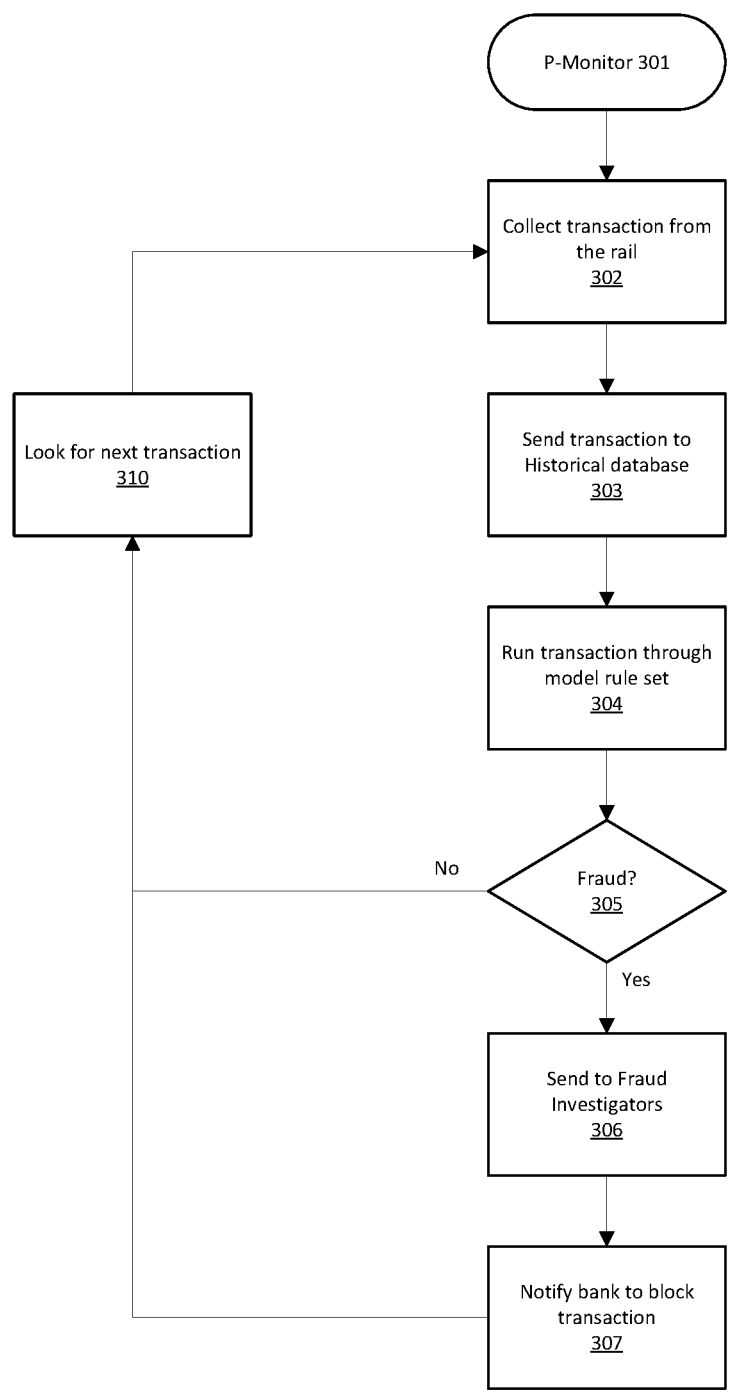
FIG. 3 is a flow chart of the p-monitor rail monitoring process.

FIG. 3 shows a flow chart of the p-monitor software 105 using the model rule set 104 to determine if transactions on the rail 106 are fraudulent. The p-monitor software 301 begins by collecting a transaction from the rail 302. In this embodiment, the p-monitor 406 listens to all traffic on the rail 106 in promiscuous listener mode and sorts through the network packets for application-layer transactions. In other embodiments, the transactions are sent to the p-monitor software 105 either by calling the p-monitor software 105 as a subroutine or by sending transaction messages to the p-monitor software 105, operating as software-as-a-service.

Once the p-monitor software 105 has the transaction, the transaction is sent for storage 303 in the historical data 101, and various statistics in the historical data 101 are updated. For instance, the countries where the customer sends transactions are updated, and the count of transactions per country is updated. In some embodiments, step 302 is performed in a calling routine. In other embodiments, the historical data is not updated. In still other embodiments, the transaction is stored, but the statistics are not updated immediately but are batched for updating later.

The transaction is next run through the model rule set 304. Each rule in the model rule set 104 is first examined to see if the conditions are met (CO and if the conditions are met, then the score is calculated according to the score of the incident ($X_i$). The scores for the incidents are then summed and compared to the threshold T.

$$\text{FRAUD} = T \le \sum_{i=1}^{n} C_i X_i$$

If the transaction is not determined to be fraudulent 305, then the p-monitor software 105 waits for the next transaction 310.

If the transaction is fraudulent 305, then the transaction is sent 306 to the fraud monitor 107 so that the fraud investigation team can research the transaction, verify that this is a true positive, and mark false positives. The investigation team may also inform law enforcement, close accounts, and take other measures to prevent the recurrence of the fraud.

In addition, the bank 108 is notified to block the transaction 307, in most embodiments. This may involve sending a message to the sending and receiving financial institutions requesting that the transaction be canceled. In some embodiments, the p-monitor software 105 simply returns an indication that the transaction is fraudulent, and the calling software handles the canceling of the transaction and the notifications.

Figure 4:
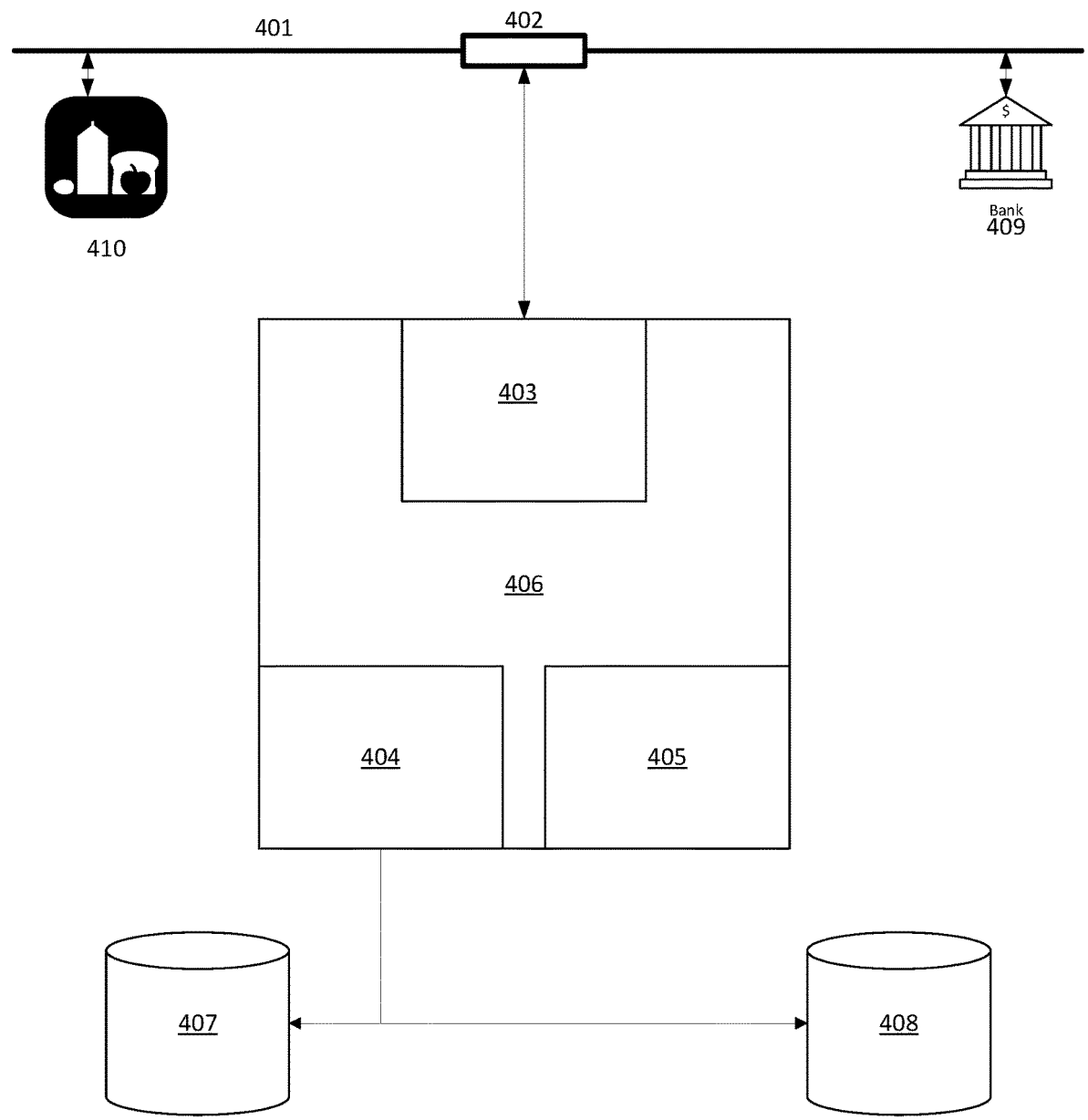
FIG. 4 is a diagram of the equipment used in one embodiment.

FIG. 4 shows one possible physical embodiment of the fraud monitoring system. The rail 401 (see also 106) is a network, such as the Ethernet (IEEE 802.3), Wi-Fi (IEEE 802.11), token ring, fiber optic, cellular in the form of a local area network, a wireless network, a wide area network or similar. The rail 401 in this embodiment has a tap 402 allowing the p-monitor 406 to access the rail 401. The rail 401 could be a payment network, a banking network, a financial transaction network, etc.

The rail 401 is connected to a merchant 410 and to a bank 409. In a typical embodiment, there would be numerous merchants and could be a number of banks as well. The merchant 410 would send a payment transaction message to the bank 409 over the rail 401, instructing that a payment be made. The p-monitor 406 listens to the rail 401 and sees the transaction, and determines if it is fraudulent. If so, the p-monitor 406 sends the bank 409 a message over the rail 401 stopping the transaction.

The tap 402 connects to a promiscuous transceiver 403, a wired or wireless receiver/transmitter that is configured to receive all rail 401 traffic.

The p-monitor 406 includes a promiscuous transceiver 403, a central processing unit 404 for comparing the rules to the transactions and for operating a promiscuous network stack. This central processing unit 404 could be a high-performance, multi-core device for handling the volume of transactions. In some embodiments, the central processing unit 404 could be a combination of ASICs for processing the network stacks and ASICs for high-performance comparison of the transactions to the rules sets. A microprocessor may also be part of this ASIC combination to manage the processing. The p-monitor 406 also includes memory 405 for storing the data while processing. In this embodiment, the transceiver 403, the central processing unit 404, and the memory 405 are mechanically and electrically connected within the p-monitor 406. The p-monitor 406 runs the p-monitor software 105, and in some embodiments also runs the tuning software 103.

The p-monitor 406 is connected, electrically, optically, or wirelessly, to the rules data store 407 and to the historical data store 408. The rules data store 407 could contain both the draft rules 101 and the model rules 104 in some embodiments. The historical data 101 is stored in the historical data store 408. In some embodiments, the historical data store 408 and the rules data store 407 could be the same physical device. Both data stores 407,408 could be a magnetic hard drive, an optical drive, a solid-state drive, a RAM, or a similar data storage device.

Figure 5:
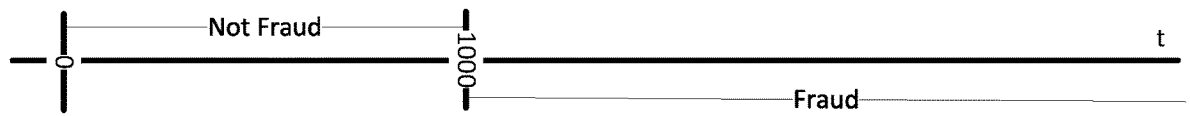
FIG. 5 is an x-y chart of the linear analysis of fraud detection.

FIG. 5 is a chart of the linear analysis of the fraud detection. The sum of the scores from each rule ($X_i$) is plotted on the line t, and if the sum is less than T (1000 in this embodiment), then no fraud is determined, otherwise, the transaction is determined to be fraudulent.

Figure 6:
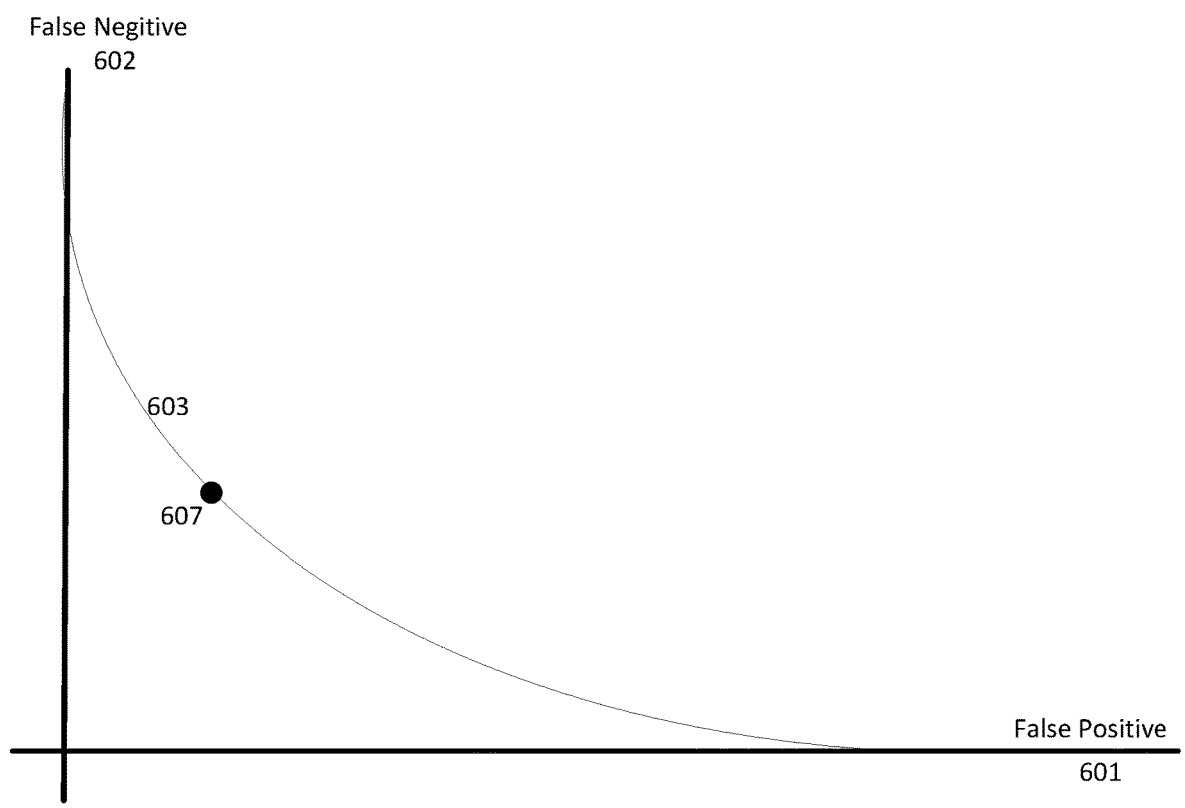
FIG. 6 is an x-y chart showing linear programming for fraud detection.

FIG. 6 is an x-y chart demonstrating, in graphical form, how linear programming is used in fraud detection. The x-axis 601 runs from zero upwards and represents the number of false positives. The y-axis 602 runs from zero upwards and represents the number of false negatives. The goal is to minimize false positives and false negatives. In some embodiments, the goal is to minimize false positives while preventing any false negatives. In other embodiments, some false negatives may be permitted. The curve of the ratio 603 of false positives to false negatives is seen as a solid line in FIG. 6. Through linear programming, the algorithms seek to minimize the false positives and false negatives while remaining within the constraints. This points to the solid circle 607. The constraints are then adjusted using the tuning software 103 to focus the rules to this solution 607.

It should be appreciated that many of the elements discussed in this specification may be implemented in a hardware circuit(s), a circuitry executing software code or instructions which are encoded within computer-readable media accessible to the circuitry, or a combination of a hardware circuit(s) and a circuitry or control block of an integrated circuit executing machine-readable code encoded within a computer-readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer-readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The above description of the embodiments, alternative embodiments, and specific examples, are given by way of illustration and should not be viewed as limiting. Further, many changes and modifications within the scope of the present embodiments may be made without departing from the spirit thereof, and the present inventions include such changes and modifications.

The invention claimed is:

1. A p-monitor comprising a central processing unit and non-transitory computer readable memory programmed to:
    create a matrix of each rule in a draft rule set for each historical transaction in historical data stored in a data store;
    solve the matrix for each rule score using linear programming;
    copy said rule scores into a model rule set;
    monitor a rail for a new transaction;
    apply data from the new transaction to the model rule set;
    produce a new transaction score from the data and the model rule set; and
    indicate that the new transaction is fraudulent if the new transaction score exceeds a threshold.

2. The p-monitor of claim 1 wherein the matrix is solved for a constant in one of the rules.

3. The p-monitor of claim 1 further programmed to notify a fraud monitor that the new transaction is fraudulent.

4. The p-monitor of claim 1 further programmed to notify a bank that the new transaction is fraudulent.

5. The p-monitor of claim 4 further programmed to request that the bank block the new transaction.

6. The p-monitor of claim 1 further programmed to:
    loop through each transaction in the historical data;
    calculate a transaction score for each historical transaction that is a sum of the rule scores for that historical transaction;
    compare the sum of rule scores with the threshold to make a fraud determination, said fraud determination compared with an actual determination associated with the historical transaction to create a transaction accuracy score; and
    sum said transaction accuracy score to determine a model rule set quality metric.

7. The p-monitor of claim 6 further programmed to compare the model rule set quality metric to an expected quality metric, and only copy the rule scores if the model rule set quality metric exceeds the expected quality metric.

8. The p-monitor of claim 1 wherein the monitoring of the rail is indirect through banking software.

9. The p-monitor of claim 1 wherein the monitoring of the rail for the new transaction receives transactions intended for another network device.

10. An apparatus comprising:
    a p-monitor;
    a rail transceiver, the p-monitor connected to the rail transceiver, the rail transceiver configured to monitor a rail for a new transaction and provide the new transaction to the p-monitor;
    a data store connected to the p-monitor, the data stored containing historical data and a draft rule set;
    the p-monitor is configured to:
        create a matrix of each rule in the draft rule set for each historical transaction in the historical data;
        solve the matrix for each rule score using linear programing, said rule scores used to form a model rule set;
        apply data from the new transaction to the model rule set to produce a new transaction score; and
        if the new transaction score exceeds a threshold, indicate that the new transaction is fraudulent.

11. The apparatus of claim 10 wherein the matrix is solved for a constant in one or more of the rules.

12. The apparatus of claim 10 wherein the p-monitor notifies a fraud monitor that the new transaction is fraudulent.

13. The apparatus of claim 10 wherein the p-monitor notifies a bank that the new transaction is fraudulent.

14. The apparatus of claim 13 wherein the p-monitor requests that the bank block the new transaction.

15. The apparatus of claim 10 wherein the p-monitor loops through each transaction in the historical data, calculating a transaction score for each historical transaction that is a sum of the rule scores for that historical transaction and comparing that score with the threshold to make a fraud determination, said fraud determination compared with an actual determination associated with the historical transaction to create a transaction accuracy score, said transaction accuracy score summed to determine a model rule set quality metric.

16. The apparatus of claim 15 wherein the model rule set quality metric is compared to an expected quality metric, and only copies the rule scores if the model rule set quality metric exceeds the expected quality metric.

17. The apparatus of claim 10 wherein the p-monitor is connected to the rail transceiver through banking software, said banking software configured to receive the new transaction from the rail transceiver and pass the new transaction to the p-monitor.

18. The apparatus of claim 10 wherein the rail transceiver receives the new transaction in a message directed specifically to the p-monitor for processing.

19. The apparatus of claim 10 wherein the rail transceiver monitors the rail for the new transaction intended for another network device.

20. An apparatus comprising:
    a p-monitor;
    a rail transceiver, the p-monitor connected to the rail transceiver, the rail transceiver configured to monitor a rail for a new transaction and provide the new transaction to the p-monitor;

a data store connected to the p-monitor, the data store containing historical data and a draft rule set;

the p-monitor including:

a means for creating a matrix of each rule in the draft rule set for each historical transaction in the historical data;

a means for solving the matrix for each rule score using linear programming, said rule scores used to form a model rule set;

a means for producing a new transaction score by applying data from the new transaction to the model rule set; and if the new transaction score exceeds a threshold, indicate that the new transaction is fraudulent.

\* \* \* \* \*